United States Patent [19]

Haug

[11] Patent Number: 5,098,231
[45] Date of Patent: Mar. 24, 1992

[54] SHAPER CUTTER WITH DISPOSABLE SPRING TYPE INSERT

[76] Inventor: Edward W. Haug, 2031 N. Mulford Rd., Rockford, Ill. 61107

[21] Appl. No.: 672,119

[22] Filed: Mar. 19, 1991

[51] Int. Cl.$^5$ .............................................. B23F 21/28
[52] U.S. Cl. ........................................ 407/28; 407/30
[58] Field of Search ............................... 407/20-32, 407/15-19

[56] References Cited

U.S. PATENT DOCUMENTS

| | | | |
|---|---|---|---|
| 4,576,527 | 3/1986 | Haug | 407/28 |
| 4,629,377 | 12/1986 | Tlaker et al. | 407/28 |
| 4,673,317 | 6/1987 | Haug | 407/28 |
| 4,784,538 | 11/1988 | Tlaker et al. | 407/28 |

*Primary Examiner*—David L. Pirlot
*Assistant Examiner*—Kevin J. Carroll

[57] ABSTRACT

A shaper cutter includes an elongated body having a flat forward end surface perpendicular to the axis of the body and having teeth formed around its periphery, and further includes a thin insert being mechanically secured to the end surface of the body and having peripheral cutting teeth which lie against the teeth of the body, the teeth of the insert serving to cut a work piece and being backed by the teeth of the body. The insert is in the form of a Belleville spring which, in its unstressed state, has a conical shape. The mechanical means used to secure the insert to the body deflects the insert into a flat configuration whereby its bottom side is forced into intimate face to face contact with the flat forward end surface of the body, and the teeth of the insert are thus positively biased by inherent spring force against the flat end surface of the supporting teeth, and are operable to cut a work piece as the tool is advanced forwardly.

16 Claims, 3 Drawing Sheets

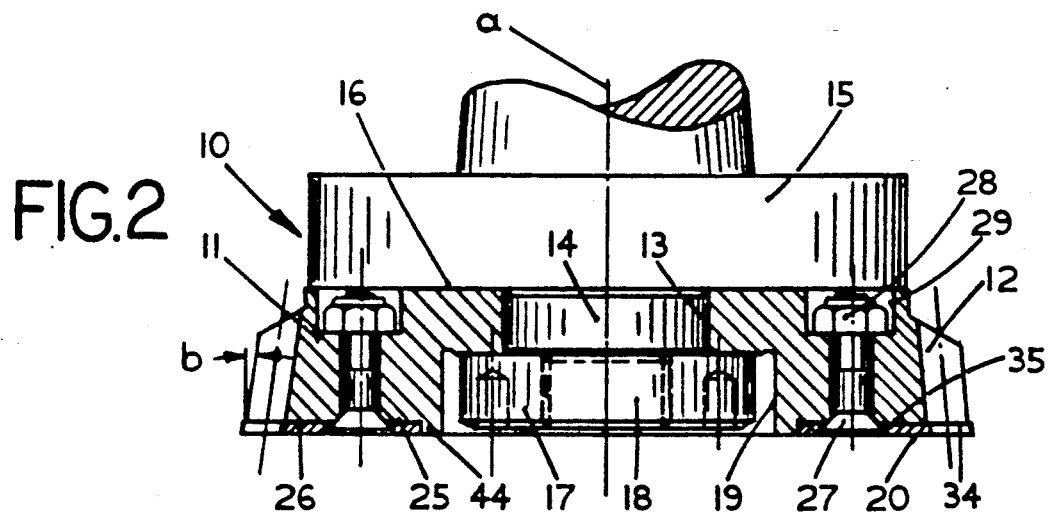
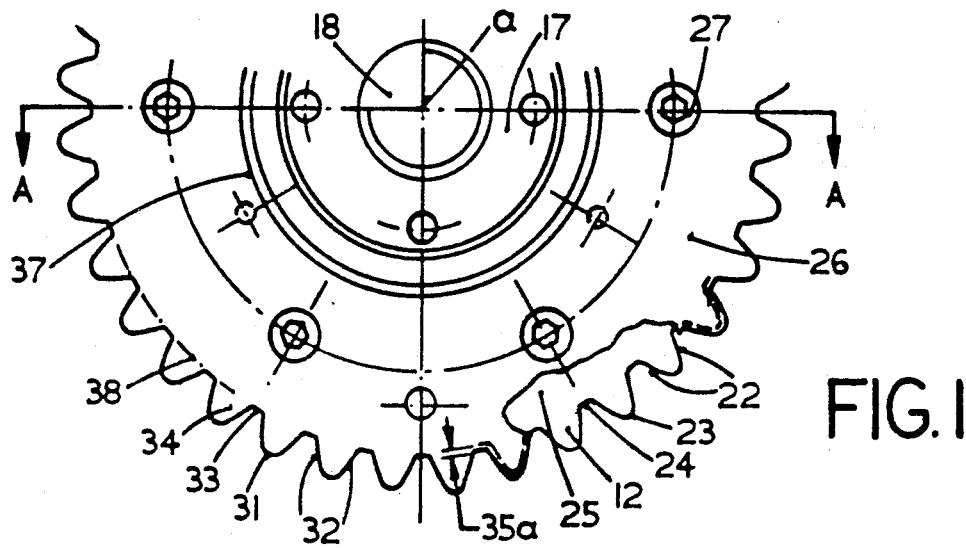
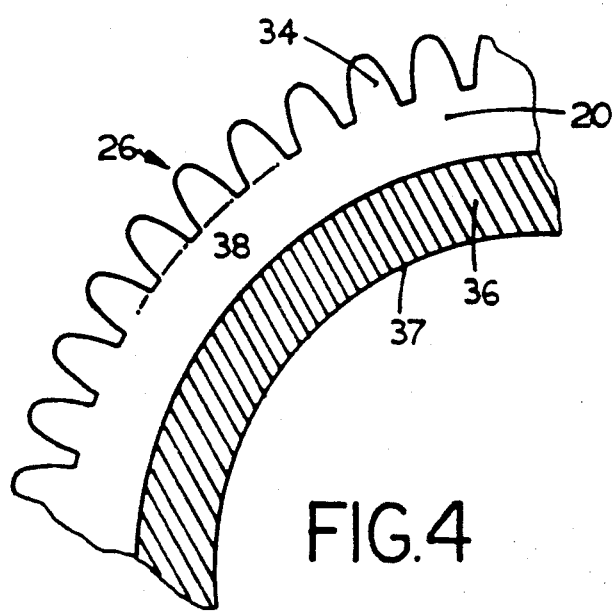
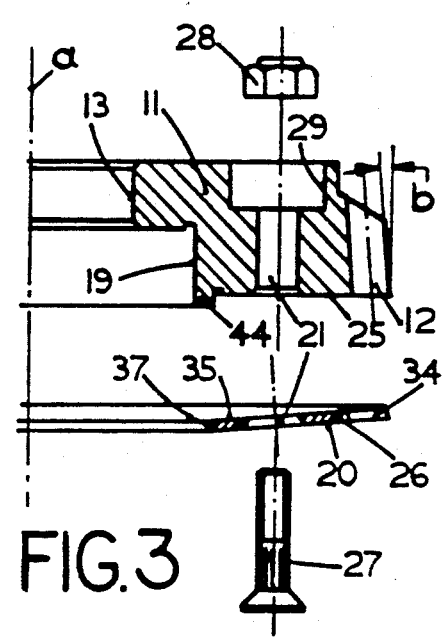

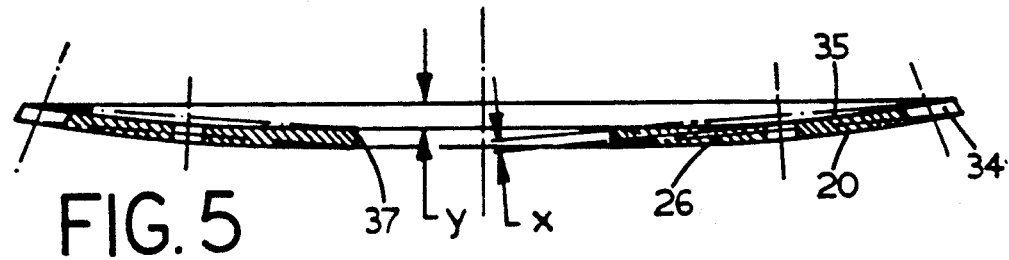
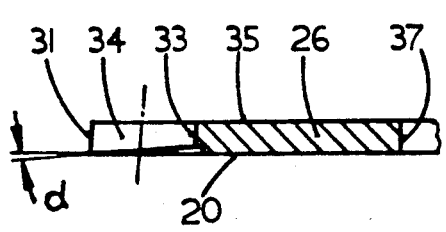
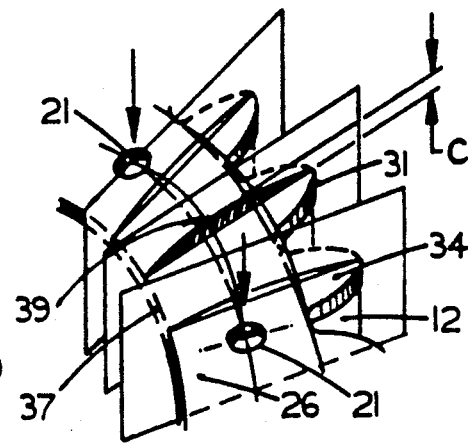
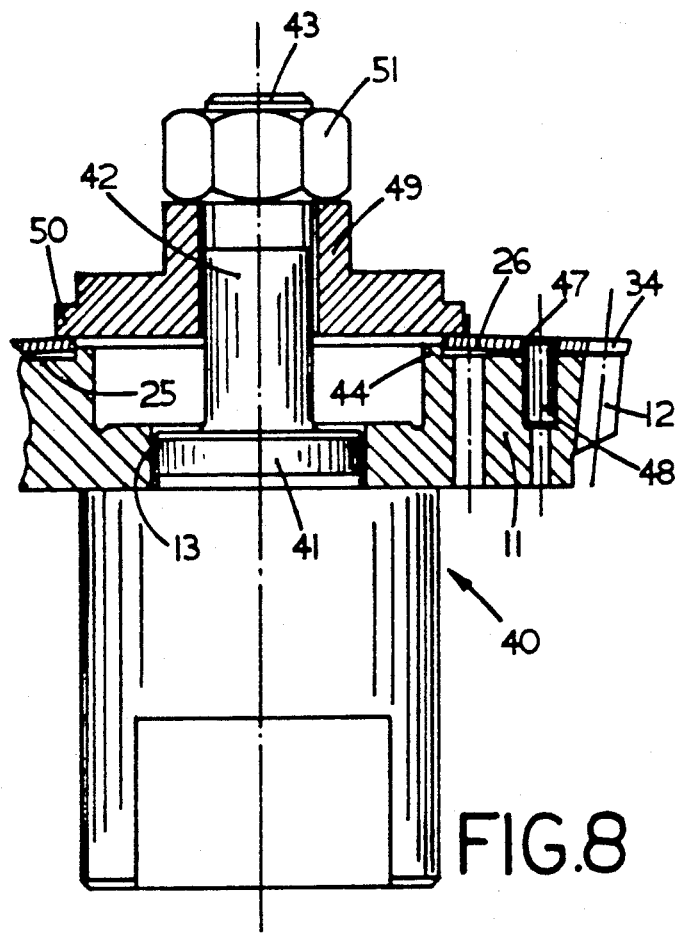
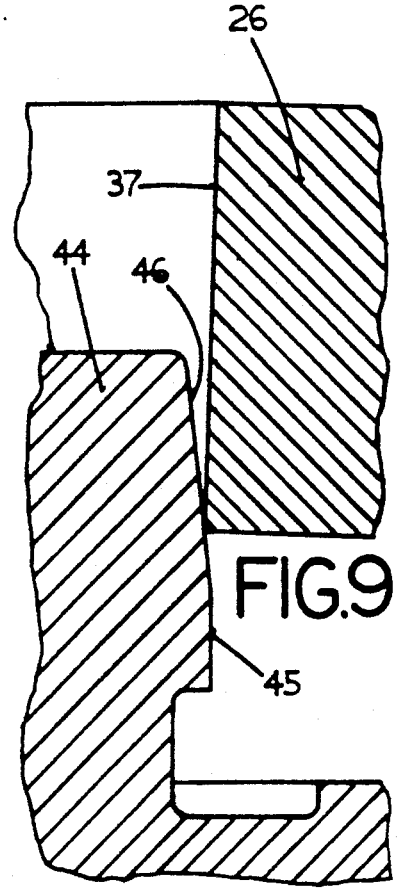

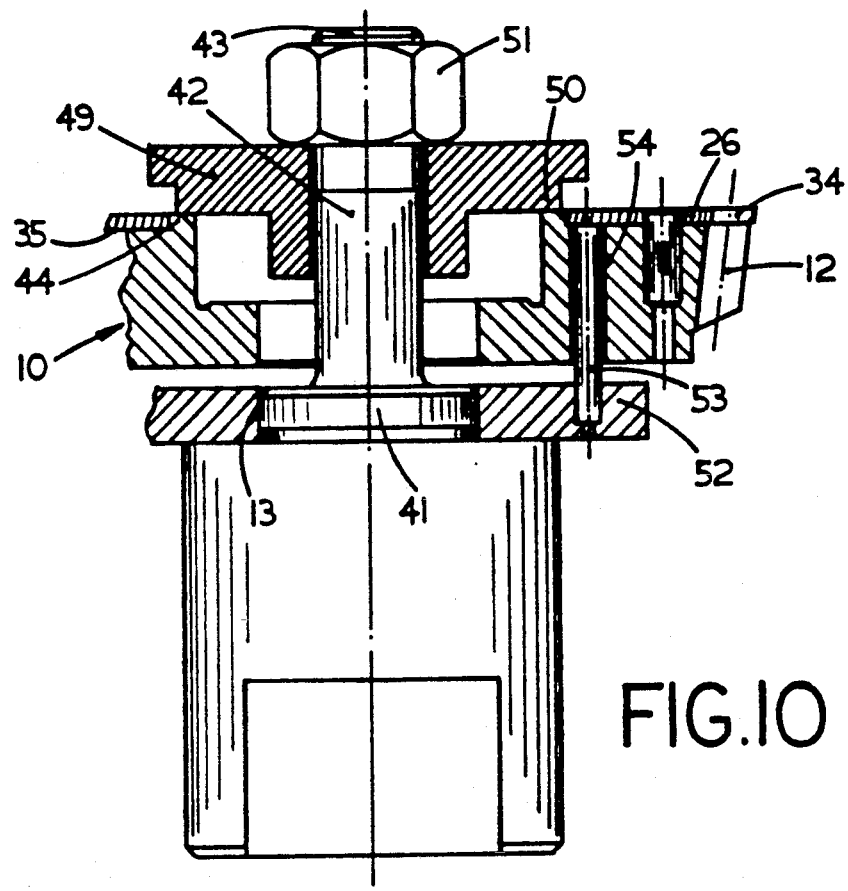
FIG.10
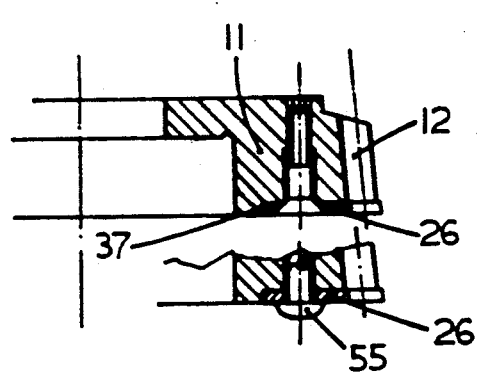
FIG.11
FIG.12
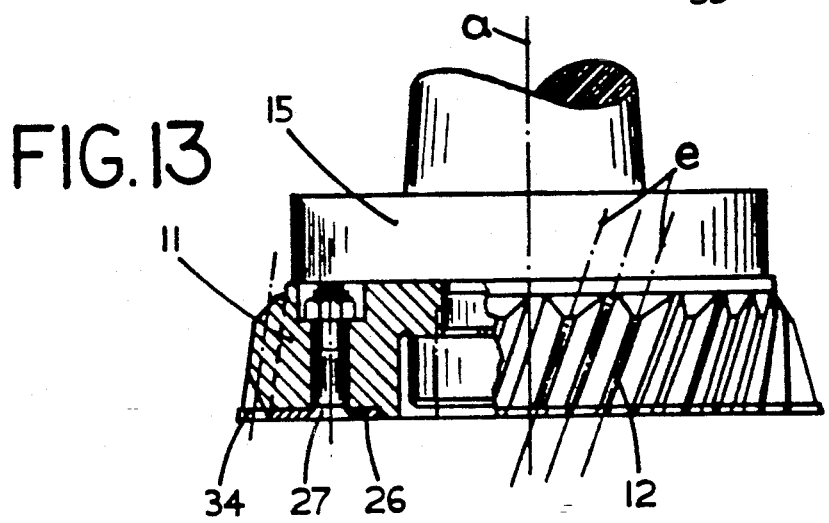
FIG.13

1

SHAPER CUTTER WITH DISPOSABLE SPRING TYPE INSERT

BACKGROUND OF THE INVENTION

This invention relates to a cutter for a shaper and, more particularly, to a cutter for cutting irregular shapes such as teeth of a gear. Customarily, such cutters include a body with a plurality of teeth spaced angularly around the periphery of the body. The ends, sides and roots of the teeth are inclined radially inwardly from the face of the body so that the edges of the teeth constitute the cutting edges of the cutter. The cutter body is, in turn, clamped to the spindle adapter on the machine.

Frequently, the cutter is surface coated with a thin film of titanium nitride in order to enhance its life. When the cutting edges of most present commercially used shaper cutters become dull, they are resharpened by grinding the face of the tool and hence the faces of the teeth. Such grinding presents a number of difficulties. For one thing, because the ends, sides and roots of the teeth are inclined, the grinding changes the relationship between the cutter and the workpiece and thus the original setup of the cutter in the machine. Consequently, the original setup of the cutter and the work must be adjusted to compensate for this. Also it is difficult to achieve a high quality of sharpening as compared with the sharpening performed at the point of manufacture. In addition, where the cutter is coated, the cutting edges and surfaces are no longer coated after grinding.

My prior U.S. application Ser. No. 615,775, filed May 31, 1984, now U.S. Pat. No. 4,576,527 discloses a shaper cutter which overcomes the foregoing problems. In the cutter disclosed in that patent, teeth with cutting edges are formed on a thin flexible wafer which is attached to and conforms with the teeth and face of a tool body, the latter being basically the same as the cutting body of prior cutters and serving to back the cutting teeth of the wafer. When the cutting edges become dull, the thin wafer is simply removed and replaced with a new one. To attach the wafer to the tool body in conformity with the teeth and face thereof, provision is made of a clamping ring adapted to lie against the end face of the wafer. When a fastener is tightened, the clamping ring flexes the thin wafer into conformity with the tool body and clamps the wafer and the body in assembled relationship.

In the cutter of U.S. Pat. No. 4,576,527, the clamping ring projects ahead of the wafer and creates a potential source of axial interference when the cutter is advanced through its cutting stroke.

In addition, as noted previously, the tool body is clamped to the spindle adapter of the machine. The clamping force thus being exerted also subjects the clamping ring shoulder, which flexes the insert against the cutter body, to high shear stresses and potential fracture.

My prior U.S. application Ser. No. 827,648, filed Feb. 10, 1986 which issued as U.S. Pat. No. 4,673,317 on Jun. 16, 1987 addressed the above shortcomings by a new design where the wafer is bonded to the face of the tool body by a high strength adhesive. When the teeth of the wafer become worn, the cutter assembly is heated to a high temperature to destroy the bond and enable the removal and replacement of the insert. Although this design is functional, the procedure for insert replacement has been proven to be time consuming and cumbersome. Particularly the heating of the cutter assembly and the subsequent cleaning of clamp and cutter body, were found to be non cost effective operations in a production environment.

Another design of a disposable shaping tool is the subject of the Tlaker et al U.S. Pat. No. 4,629,377. The disposable flexible disc of this design has the basic configuration of a spur gear and consequently can be used on both sides. When clamped, the flexible disc is deflected to a negative rake angle, thereby creating the required clearance angles on the cutter teeth. The negative rake angle however tends to inhibit chip flow, which increases tool wear. Also it is not practical to use this tool for any typical shaping applications which require shaping against a shoulder where interference with the axially protruding clamp elements would exist.

SUMMARY OF THE INVENTION

It is an object of the present invention to provide a new and improved shaper cutter assembly, with a disposable insert which can be mechanically secured onto the tool body in such a manner that the working face of the insert is free of obstructions, thus eliminating any axial interference during the shaping operation.

Another object of the invention is to mechanically secure the insert rigidly onto the cutter body without subjecting the clamping means to the force by which the cutter assembly is clamped onto the cutter spindle.

A further object of the invention is to have the cutter assembly simplified, by reducing its number of manufactured parts while at the same time providing means to locate the disposable insert in a highly accurate manner on the cutter body, and also making the insert easily removable and replacable. A more detailed object of the invention is to achieve the foregoing by fastening the insert to the flat top surface of the cutter body with a number of screws and nuts for which corresponding mounting holes are provided in the body and the insert.

In its basic aspect, the invention resides in using a cutting insert, which differs from the wafers and flexible discs previously discussed, by having the shape of a belleville spring thus ensuring that all teeth of the insert, like individual prestressed leaf springs, are biased against and in intimate contact with the corresponding, flat supporting tooth surfaces on the cutter body after the insert has been mounted.

These and other objects and advantages will become more apparent from the following detailed description when viewed in conjunction with the accompanying drawings.

BRIEF DESCRIPTION OF THE DRAWINGS

FIG. 1 is an end view of a cutting tool embodying the present invention with the tool mounted on the spindle adapter of a shaper FIG. 2 is a sectional view taken along line A—A of FIG. 1

FIG. 3 is a sectional exploded view of the marginal portion of the tool body and insert, together with one clamp screw and nut FIG. 4 is a fragmentary end view of an insert showing typical proportions of the annular peening area.

FIG. 5 is a schematic cross-sectional view of a belleville spring insert

FIG. 6 is an exaggerated schematic drawing, illustrating the nature of residual deflection when a belleville spring insert is mountyed to a tool body by clamp screws.

FIG. 7 is an enlarged, fragmentary cross-sectional view of a tooth portion of an insert, having a cutting face with a positive rake angle.

FIG. 8 is a cross-sectional view of body and insert located on a mounting fixture which is used to press the insert onto the locating hub on the body FIG. 9 is an enlarged fragmentary cross-sectional view of the central locating hub on the body FIG. 10 is a cross-sectional view of body and insert located on a fixture as shown in FIG. 8, but adapted to effect the removal of the insert from the body FIG. 11 and FIG. 12 are enlarged fragmentary cross-sectional views of insert and tool body illustrating alternate designs and clamping means.

FIG. 13 is a side view of a helical cutter embodying the invention, with parts broken away and shown in section

DETAILED DESCRIPTION OF THE PREFERRED EMBODIMENT

The preferred embodiment of the invention is shown in FIGS. 1-3 which illustrate a cutting tool 10 for cutting gear teeth on a workpiece such as a gear blank. It is understood that the invention also applies to tools for cutting workpieces of irregular shape and that FIGS. 1-3 only serve as a means of illustration. The tool 10 includes an elongated conical steel body 11 of circular cross-section with a plurality of teeth 12 spaced angularly around its periphery. The body has a central bore 13 which locates the tool on the cylindrical portion 14 of a spindle adaper 15 in a shaping machine. (Not shown) The body 11 abuts and is clamped against a shoulder 16 of the spindle adapter 15 by a nut 17 which is located on the threaded end 18 of the spindle adapter. The body 11 has a counterbore 19 which receives the nut 17 in its entirety, that is, without any part of the nut protruding axially beyond surface 20 of the cutting tool 10.

During the cutting operation the tool, mounted on the machine cutter spindle, (not shown) rotates with the spindle around its axis "a" while the work is turning in synchronism about its own axis. During such rotation, the tool is reciprocated longitudinally relative to the work, and during its downstroke, is brought into cutting engagement with the work. The teeth on the tool thereby cut the teeth on the work periphery by what is called a generating process, resulting in the teeth on the work having conjugate forms to the teeth on the tool. In the case of a gear being shaped, these conjugate forms are involutes.

In further keeping with the illustrated embodiment of this invention, the face 25 on the forward end of body 11 (FIG. 2) is a flat surface perpendicular to the tool axis "a". A thin, flexible insert 26 is centrally located on a short hub 44 protruding beyond surface 25. the insert is secured onto this flat surface with a number of flat head screws 27 which are located equally spaced at a radial distance from the center of the tool and extend, parallel to the tool axis "a", through corresponding holes 21 in insert 26 and body 11. The insert 26 has teeth 34 on its periphery which conform to teeth 12 on the tool body.

The insert 26 is secured to face 25 by tightening of the nuts 28 which are threaded onto the screws 27 and located in counterbores 29 of body 11. As illustrated, there are no parts of any securing means, neither screws 27 nor nut 17 protruding axially beyond the cutting face 20 which could cause interference with part of the workpiece or the work tooling. Also as illustrated, mechanical means (screws 27) are provided for securing the insert 26 to the body 11 independently from the clamping means (nut 17) by which the cutting tool 10 is mounted to the spindle adapter. Referring still to FIGS. 1-3, the ends 23 and the roots 24 of the teeth 12 on body 11 are inclined radially inward away from the face 25 to provide a back-or relief angle "b" which is usually between 4 and 8 degrees. The sides 22 of the teeth are inclined toward each other in axial direction so as not to rub the work during cutting. The ends 31, roots 33 and sides 32 of the teeth 34 on the insert when mounted have the same relief angles as the teeth 12 on the body 11, but are larger than the supporting teeth on the face 25 of body 11, extending by a small margin 35a (e.g. 0.010") beyond their tooth edge periphery.

While FIGS. 1-3 illustrate a typical tool of spur design with teeth 34 of insert 26 and teeth 12 of body 11 extending in axial direction, FIG. 13 shows a tool of helical configuration, with insert teeth 34 and body teeth 12, while still inclined radially inward, extending along helices 'e' of uniform lead. During the shaping of a helical workpiece, cutter spindle and cutter, when advanced axially, are imparted an additional rotating motion to have the cutter in effect advance and cut along a desired helical path. To avoid interference between cutter body teeth 12 and workpiece during cutting, the teeth 34 on insert 26 as well as teeth 12 on body 11 extend along helices identical to the cutting path.

The insert 26 can be made of highly alloyed high-speed steel, hardened to 64-66 Rockwell C. In order to use a minimum amount of this material, which can be expensive, the insert is preferably designed to the minimum thickness (typically 0.050") required to sustain the cutting loads. Also, in terms of manufacturing, the thinner the inserts, the more accurately and efficiently can they be laser cut from sheet material.

To achieve the objectives of this invention all teeth 34 of the insert 26 must be in intimate contact with the supporting surface 25 of the teeth 12 on body 11. Accordingly, as an important aspect of the present invention, such intimate contact is achieved by manufacturing the insert 26 in the form of a belleville spring (FIG. 3), having a conical shape with a bottom side 35 and a top side 20. When secured to the tool body using screws 27, the belleville spring is deflected into a flat configuration with the bottom side 35 forced into intimate contact face to face contact with the flat forward end surface 25 of the tool body. In this condition, the individual teeth 34 of the insert, like prestressed leaf springs, are biased by spring force against the top surface 25 of the supporting teeth 12.

An insert 26 in the shape of a belleville spring can be manufactured without difficulties which is not the case if the insert were simply a thin flat disc. In manufacturing the latter, uncontrollable stresses are induced during the grinding of the opposing surfaces 20 and 35 which tend to leave the insert in a non flat, warped condition.

When such a warped insert is mounted onto the cutter body and clamped against the supporting surface with screws and nuts, some of the teeth of the insert lift off from the supporting surface, leaving a gap which can be as much as 0.005". Such a condition will result in vibration of these teeth during cutting, leading to the deterioration of the supporting surface 25 of the teeth 12, to fatigue of teeth 34 and ultimately, to premature failure of the tool. Belleville type inserts can be manufactured by putting a section of their surface 20 under uniform compression through a peening or shot blasting operation. Either steel shot or glass beads under approx. 65 psi pressure, as employed in commercial equipment, can be used.

The peening operation should produce an insert of near true conical shape (FIG. 3) with an amount of "bow" x (FIG. 5) not exceeding 0.0005 inches. This can be achieved by peening only an annular section 36 of surface 20 (FIG. 4) which extends radially outward from the bore periphery 37 of the insert to the approximate midpoint between bore and root diameter 38 of the teeth 34. The magnitude of the deflection height y of the insert (FIG. 5) is strictly a function of the peening time. For best results y should be in the range of 0.010 inches to 0.040 inches which can be achieved in a peening time of 30 sec. to 60 sec.

As previously discussed, the spring type insert 26 (FIG. 3) is secured to the tool body by individual screws 27 and nuts 28 which are located on a circle at approximately mid dimension between bore 37 and tooth root diameter 38 of the insert. If there are too few clamp screws, which means they are spaced too far apart, there tends to remain an area of residual deflection (FIG. 6) where the insert 26 is not forced into intimate contact with the surface 25 of body 11. This becomes particularly evident at mid distance points 39 between individual screws where a residual deflection maximum "c" exists. From this point 39 radially outward to the tooth tip 31 and radially inward to the cutter bore 37 as well as circumferentially toward the two adjacent clampscrews, the amount of residual deflection gradually decreases to zero.

The residual deflection maximum at points 39 becomes minute if the spacing of the clamp screws 27 as measured on the bolt circle does not exceed 1.5 inches, provided of course, that the thickness of the insert, its deflection height y and its amount of "bow" x (FIG. 4) are held within the previously mentioned limits. The criterion is that all the teeth 34 of an insert 26 conform to the flat surface 25 of the cutter body 11 within 0.0002 inches..

Contrary to the design shown in FIG. 2 where the cutting surface 20 is a plane, perpendicular to the cutter axis "a", conventional shaper cutters are customarily designed with a concave cutting face in the shape of a shallow cone whoes apex is located on the cutter axis "a". The angle between the imaginary base of this cone and its conical surface is called the rake angle of the tool. It is in magnitude usually in the range of 4 to 8 degrees with 5 degrees being standard. The purpose of this rake angle is to provide for a gentle entry of the tool into the work during the shaping process, creating less of an abrupt cutting load. On the other hand it has been shown that the smaller the rake angle the higher the tool life tends to be, with a tool life maximum indicated at a rake angle of zero degrees.

While the cutting loads on cutters with teeth of shallow depth are generally low, a zero degree rake angle as presented by the illustrated flat cutting surface 20 of cutting tool 10 would be preferred. However, it is also within the scope of this invention to provide belleville spring inserts 26 with cutting faces having positive rake angles "d". (FIG. 7) The design of such inserts provides for the conical cutting surface to extend from the tooth tips 31 to the tooth roots 33 or just slightly beyond, in order to minimize any cross-sectional weakening of the teeth on insert 26. The magnitude of rake angle "d" should be chosen so that the thickness "t" at the root of the teeth 34 is no less than 0.040 inches. Accordingly, and as an example, this would allow inserts of 0.050" thickness with a tooth height of up to 0.11 inches to be manufactured with rake angles of at least 5 degrees whereas an insert of 0.060" thickness and 0.375 inches tooth height could be provided with a maximum rake angle of 3 degrees.

For mounting an insert 26 onto the cutter body 11 a fixture 40 (FIG. 8) can be used. This fixture includes a cylindrical body with a pilot section 41 designed to fit into bore 13 of the cutter body 11, thereby locating it on the fixture. A smaller diameter cylindrical shaft 42 which has a threaded end 43 extends beyond the pilot section 41. After locating the cutter body 11 on pilot section 41 of the fixture, an insert 26 is placed on the short, central locating hub 44 of body 11. To facilitate this, the locating hub 44, which in its lower section 45 is designed for a slight interference fit with insert 26, has a 5 degree tapered lead in section 46 (FIG. 9). The insert 26 also has a ground hole 47 which is located in a position radially outward from its bore 37. When an insert 26 is placed on hub 44 it is at the same time angularly oriented so that the hole 47 engages a pin 48 which is pressed into body 11 in a radial location corresponding to the location of hole 47. This arrangement ensures that the insert 26 when clamped down stays angularly locked to the the body 11, keeping its teeth 34 and the supporting teeth 12 of the body 11 in permanent alignment regardles of the cutting forces.

To press the insert 26 onto the locating hub 44 a sleeve 49 with a flange 50, which is slightly larger than the bore of the insert, is first placed over shaft 42. A nut 51 is then threaded onto the shaft end 43 and tightened until insert 26 is completely seated against surface 25. Subsequently, and before the cutter is removed from the fixture 40, the insert 26 is secured by screws 27 and nuts 28. For the removal of the insert 26 from the body 11 the same fixture 40 can be used (FIG. 10). However a ring 52 carrying three eqyally spaced pins 53 is first placed over the pilot section 41 of the fixture. After screws 27 and nuts 28 have been removed from the cutter, the latter is lowered over shaft 42 in such a way that the three pins 53 carried by ring 52 enter the three correspondingly located ejection holes 54 in the body 11. The cutter 10 comes to rest when the upper ends of the pins 53 butt against the underside 35 of insert 26. The sleeve 49 is now inverted and placed over shaft 42 until it rests with the smaller diameter end of flange 50 on the top surface of locating hub 44. When the nut 51 is tightened, the cutter body 11 is pushed downward by sleeve 49 while at the same time the pins 52 are forcing the insert 26 off the locating hub 44.

It has to be emphasized that, aside from the features and advantages previously discussed, it is a major object of this invention to provide a rebladeable shaping tool of the most simple design and highest accuracy, which is easy to manufacture. The tool has only two manufactured parts, an insert 26 and a body 11, which are joined by an interference fit, to ensure absolute concentricity. The body requires only turning and drilling operations besides machining of the teeth in the soft and final grinding after hardening. The insert can be completely laser cut out of sheet material including bore 37, teeth 34, screw holes 21 and pin hole 47. The only additional machining in the soft is the countersinking of the screw holes to accommodate the flat head screws 27. The position accuracy of the screw holes in the inserts is not critical since the screws can be radially and circumferentially floating in the corresponding clearance holes 21 in body 11. After the inserts are hardened, their sides 20 and 35, bore 37 and pin hole 47 are ground. The inserts are then shot peened as previously disclosed. Subsequently they are mounted on the body for the grinding of the teeth 34 which is preferably accomplished with a dressable Borazon wheel in a state of the art form grinding operation. As a final operation the inserts are coated by a thin film of titanium nitride.

Although the above description is the preferred embodiment of the invention, it is understood, that in cases where there is no potential interference between tool and work, conventional screws, such as button head screws 55 (FIG. 12) instead of flat head screws 27 can be used for mounting the inserts. Also, where the diameter of the cutter is too small to accommodate counterbores 29 for nuts 28 the screw holes in the body could be tapped so that the screws 27 or 55 can be threaded directly into body 11. (FIG. 11)

It is further understood that the disclosed basic design of this cutting tool, consisting of a body 11 and of a belleville spring type insert 26 which are concentrically joined together by an interference fit does not exclude any other means by which the insert 26 could be clamped against the surface 25 of body 11.

I claim:

1. A metal cutting tool comprising an elongated body of circular cross-section having a flat forward end surface perpendicular to the axis of the body, a plurality of radially projecting teeth formed in an angularly spaced pattern on the periphery of said body, a thin flexible sheet metal insert mechanically secured to the forward end surface of said body by a securing means, and having a top side and a bottom side, a plurality of radially projecting cutting teeth spaced angularly around the periphery of said insert, the number of cutting teeth on said insert being equal to the number of teeth on the body and the cutting teeth on said insert being larger on their ends, sides and roots than the teeth on the body, whereby the cutting teeth on the insert extend slightly beyond the ends, sides and roots of the teeth on the body, said sheet metal insert being a belleville spring which, in its unstressed state, has a conical shape, said insert being deflected by the securing means into a flat configuration whereby its bottom side is forced into intimate face to face contact with the flat forward end surface of the body, with the cutting teeth of said insert being aligned angularly with the teeth on the body, the teeth of said insert being positively biased by inherent spring force against the flat end surface of the teeth on the body and being operable to cut a work piece as the tool is advanced forwardly.

2. A tool as defined in claim 1 in which the deflection height of the belleville spring insert in its unstressed state is 0.010 to 0.040 inches.

3. A tool as defined in claim 1 in which the top side of the insert in its deflected state is modified in such a manner that the thickness of the insert diminishes from the tips of said insert teeth radially inward over the entirety of said insert teeth so that the top side surfaces of all said insert teeth, from tooth tips to tooth roots, are part of a conical surface with its apex at the rotational axis of the tool.

4. A tool as defined in claim 1 in which the insert is coated by a thin film of titanium nitride.

5. A tool as defined in claim 1 wherein the teeth on the body and the insert cutting teeth are of helical configuration.

6. A tool as defined in claim 1 wherein the insert is mechanically secured to the tool body by means of screws and nuts.

7. A tool as defined in claim 6 in which the insert is coated by a thin film of titanium nitride.

8. A tool as defined in claim 7 in which the top side of the insert in its deflected state is modified in such a manner that the thickness of the insert diminishes from the tips of said insert teeth radially inward over the entirety of said insert teeth so that the top side surfaces of all said insert teeth, from tooth tips to tooth roots, are part of a conical surface with its apex at the rotational axis of the tool.

9. A tool as defined in claim 8 wherein the teeth on the body and the insert cutting teeth are of helical configuration.

10. A metal cutting tool comprising an elongated body of circular cross-section having a flat forward end surface perpendicular to the axis of the body, a plurality of radially projecting teeth formed in an angularly spaced pattern on the periphery of said body, a thin flexible sheet metal insert mechanically secured to the forward end surface of said body, and having a top side and a bottom side, a plurality of radially projecting cutting teeth spaced angularly around the periphery of said insert, the number of cutting teeth on said insert being equal to the number of teeth on the body and the cutting teeth on said insert being larger on their ends, sides and roots than the teeth on the body, whereby the cutting teeth on the insert extend slightly beyond the ends, sides and roots of the teeth on the body, said sheet metal insert being a belleville spring which, in its unstressed state, has a conical shape, said insert being deflected into a flat configuration and secured by a plurality of screws and nuts located equally spaced on a circle disposed radially inward from the roots of the teeth on the body, with the screws extending parallel to the axis of the body through corresponding screw holes in the insert and the body, said nuts located in counterbored portions of the screw holes on a rearward end of the body, whereby the bottom side of the insert is held in intimate face to face contact with the flat forward end surface of the body, with the cutting teeth of said insert being aligned angularly with the teeth on the body, the teeth of said insert being positively biased by inherent spring force against the flat end surface of the teeth on the body and being operable to cut a work piece as the tool is advanced forwardly.

11. A tool as defined in claim 10 in which the screws are flat head screws and the holes in the insert are countersunk to such a depth that the heads of the screws, in their entirety, are below the top side surface of the insert, with the top side surface of the insert being the forwardmost extremity of the tool.

12. A tool as defined in claim 10 in which the spacing between the screws is 1.5 inches or less.

13. A tool as defined in claim 10 in which the deflection height of the belleville spring insert in its unstressed state is within 0.010 to 0.040 inches.

14. A tool as defined in claim 10 in which the insert is coated by a thin film of titanium nitride.

15. A tool as defined in claim 14 in which the top side of the insert in its deflected state is modified in such a manner that the thickness of the insert diminishes from the tips of said insert teeth radially inward over the entirety of said insert teeth so that the top side surfaces of all said insert teeth, from tooth tips to tooth roots, are part of a conical surface with its apex at the rotational axis of the tool.

16. A tool as defined in claim 14 wherein the teeth on the body and the insert cutting teeth are of helical configuration.

* * * * *